United States Patent [19]
Wentworth

[11] Patent Number: 5,782,311
[45] Date of Patent: Jul. 21, 1998

[54] METHOD AND APPARATUS FOR INSTALLATION OF UNDERGROUND PIPES

[75] Inventor: Steven W. Wentworth, Brookfield, Wis.

[73] Assignee: Earth Tool Company, LLC, Oconomowoc, Wis.

[21] Appl. No.: 778,456

[22] Filed: Jan. 3, 1997

[51] Int. Cl.[6] .................... F16L 1/00; F21B 4/10
[52] U.S. Cl. .................. 175/53; 175/106; 405/154; 405/184
[58] Field of Search .................. 175/19, 53, 106; 405/154, 156, 184

[56] References Cited

U.S. PATENT DOCUMENTS

| | | | |
|---|---|---|---|
| Re. 33,793 | 1/1992 | Cherrington et al. | 175/61 |
| 4,505,302 | 3/1985 | Streatfield et al. | 138/97 |
| 4,694,913 | 9/1987 | McDonald et al. | 175/61 |
| 4,720,211 | 1/1988 | Streatfield et al. | 405/154 |
| 4,738,565 | 4/1988 | Streatfield et al. | 405/154 |
| 4,945,999 | 8/1990 | Malzahn | 175/19 |
| 4,953,633 | 9/1990 | Hermans | 165/109.1 |
| 5,070,948 | 12/1991 | Malzahn et al. | 175/19 |
| 5,242,026 | 9/1993 | Deken et al. | 175/62 |
| 5,580,188 | 12/1996 | Nowak | 405/184 |
| 5,628,585 | 5/1997 | Parish, III et al. | 175/53 X |
| 5,687,805 | 11/1997 | Perry | 175/53 |

*Primary Examiner*—David J. Bagnell
*Attorney, Agent, or Firm*—Philip G. Meyers; Gardere & Wynne, L.L.P.

[57] ABSTRACT

A pipe bursting apparatus includes a directional boring machine capable of simultaneously rotating and pulling a drill string and an impact tool connectable to the drill string. The impact tool includes a tubular housing ending in a front bursting head, an input shaft, bearings supporting the input shaft for rotation within the housing, a striker disposed for reciprocation within the housing to deliver impacts to a front anvil, and a drive mechanism for simultaneously pulling the impact tool forward in response to a pulling force on the input shaft and for reciprocating the striker to drive the tool forward by the action of cyclic impacts on the front anvil. The apparatus can carry out a pipe bursting operation in a manner that eliminates the need to use a separate pneumatic impact tool to burst the existing pipe.

19 Claims, 4 Drawing Sheets

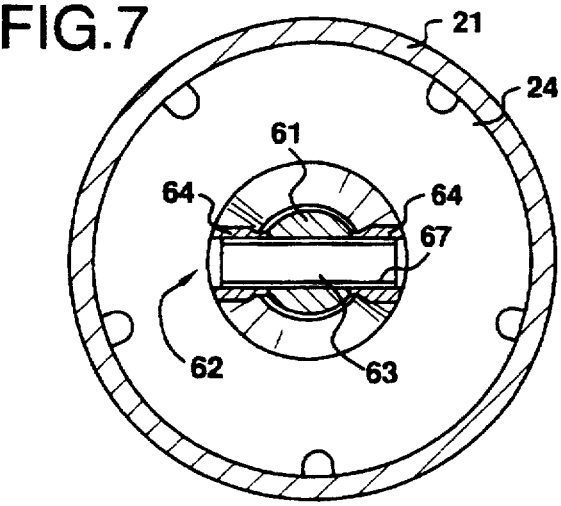
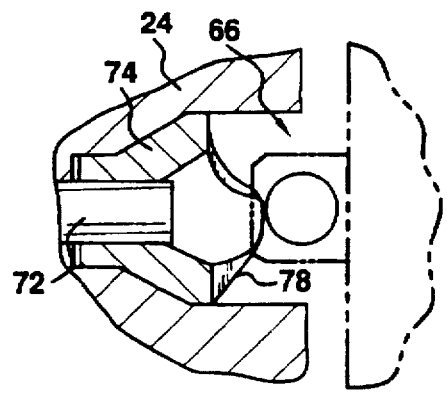
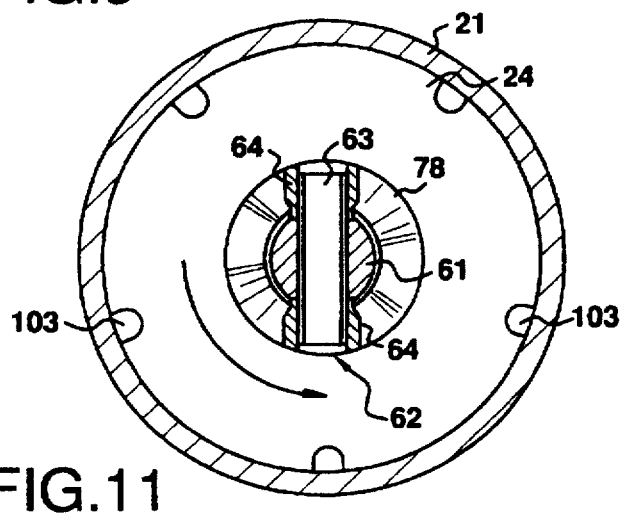
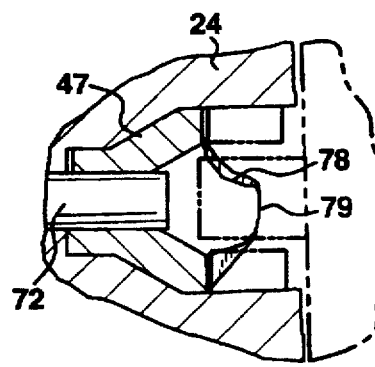
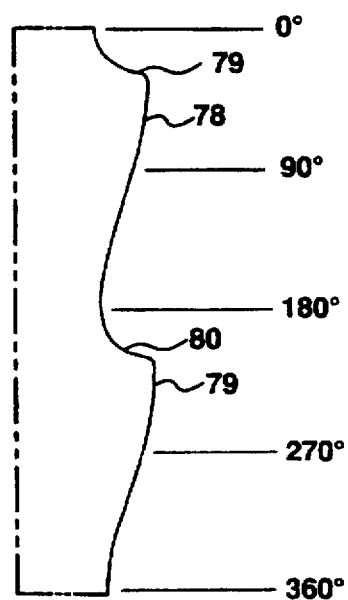
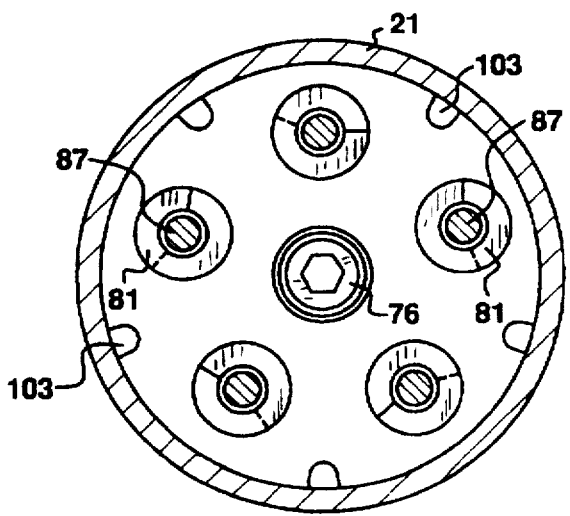

METHOD AND APPARATUS FOR INSTALLATION OF UNDERGROUND PIPES

TECHNICAL FIELD

This invention relates to directional boring, particularly to an apparatus and method for installing a pipe and simultaneous bursting a surrounding existing pipe.

BACKGROUND OF THE INVENTION

Directional boring apparatus for making holes through soil are well known. The directional borer generally includes a series of drill rods joined end to end to form a drill string. The drill string is pushed or pulled through the soil by means of a powerful hydraulic device such as a hydraulic cylinder. See Malzahn U.S. Pat. Nos. 4,945,999 and 5,070,948, and Cherrington U.S. Pat. No. 4,697,775 (RE 33,793). The drill string may be pushed and rotated at the same time as described in Dunn U.S. Pat. No. 4,953,633 and Deken et al. U.S. Pat. No. 5,242,026. A spade, bit or head configured for boring is disposed at the end of the drill string and which may include an ejection nozzle for water to assist in boring.

In one variation of the traditional boring system, a series of drill string rods is used in combination with a percussion tool mounted at the end of the series of rods. The rods can supply a steady pushing force to the impact tool and the interior of the rods can be used to supply the pneumatic borer with compressed air. See McDonald et al. U.S. Pat. No. 4,694,913. This system has, however, found limited application commercially, perhaps because the drill string tends to buckle when used for pushing if the bore hole is substantially wider than the diameter of the drill string.

A variety of systems are now known for the installation of underground pipes, particularly for the replacement of an existing deteriorated pipe. In one widely practiced method, a pneumatic impact boring tool is sent through the existing pipeline such that the head of the tool, which may be provided with blades that apply intense local pressure to the existing pipe, fractures or splits the existing pipe. See, for example, Streatfield et. al. U.S. Pat. Nos. 4,720,211, 4,738,565 and 4,505,302. A replacement pipe, typically made of plastic such as HDPE, can be drawn along behind the boring tool. This process has proven effective commercially because it bursts the old pipe and replaces it with a new pipe at the same time. However, the system relies on a pneumatic impact tool, which in turn requires an air compressor. Exhaust from the impact tool is vented into the interior of the replacement pipe, which is unacceptable for certain types of pipe installations, such as gas and water lines.

Directional borers are less effective for pipe bursting, especially for hard to burst pipes like cast iron, because the steady pushing force of the drill string lacks the impact power of a pneumatic impact boring tool. Thus, in some instances, a directional borer or winch is used to pull a pneumatic impact tool through a existing pipeline in order to burst the existing pipe and pull in the replacement pipe. These alternatives are effective but require considerable equipment and manual labor. A need remains for a pipe bursting system that can avoid the need for a pneumatic impact tool and still provide cyclic impacts suitable for pipe bursting operations.

SUMMARY OF THE INVENTION

The present invention provides an apparatus and method for bursting an underground pipe with the option of simultaneously replacing the existing pipe with a replacement pipe. More particularly, a pipe bursting apparatus of the invention includes a drill string, a directional boring machine that can simultaneously rotate and pull the drill string, and an impact tool. The impact tool has a tubular housing ending in a front bursting head, an input shaft connectable to the drill string, bearings supporting the input shaft for rotation within the housing, a striker disposed for reciprocation within the housing to deliver impacts to a front anvil, and a drive mechanism that can simultaneously pull the impact tool forward in response to a pulling force on the input shaft and reciprocate the striker in response to rotation of the input shaft and drill string to drive the tool forward by the action of cyclic impacts on the front anvil.

The foregoing apparatus can be used to carry out a pipe bursting method of the invention, which includes the steps of positioning the drill string inside the existing pipe with the directional boring machine at one end of the existing pipe and the impact tool at the other end thereof, connecting the drill string to the input shaft, positioning the impact tool coaxial with the existing pipe, preferably with the bursting head in contact with the existing pipe, rotating the drill string with the boring machine whereby the striker of the impact tool delivers impacts to the front anvil, which impacts are sufficient to cause the bursting head to burst the existing pipe, and pulling the impact tool through the existing pipeline, most economically using the pulling force of the directional boring machine. A replacement pipe may be mounted to the rear end of the impact tool so that it is drawn into the space occupied by the pipeline being progressively ruptured as the impact tool advances. Such a method eliminates the need to use a pneumatic impact tool to burst the existing pipe.

The apparatus of the invention can also be in a similar manner to widen used an existing borehole, such as a hole left by the removal of an existing pipe or a pilot hole made using the directional borer. The method includes the steps of positioning the drill string inside the existing borehole with the directional boring machine at one end of the existing borehole and the impact tool at the other end, connecting the drill string to the input shaft, positioning the impact tool coaxial with the existing borehole, rotating the drill string with the boring machine whereby the striker of the impact tool delivers impacts to the front anvil, which impacts are sufficient to cause the boring head to advance in the existing borehole, and pulling the impact tool through the existing borehole.

Objects, features and advantages of the invention will become apparent from the following detailed description. It should be understood, however, that the detailed description is given by way of illustration only, since various changes and modifications within the spirit and scope of the invention will become apparent to those skilled in the art from this detailed description.

BRIEF DESCRIPTION OF THE DRAWING

The invention will hereafter be described with reference to the accompanying drawing, wherein like numerals denote like elements, and:

FIG. 6 is a cross-sectional view taken along the line 6—6 in FIG. 3;

FIG. 7 is a cross-sectional view taken along the line 7—7 in FIG. 3;

FIG. 8 is partial, enlarged view of the cam mechanism of FIG. 3, with the rollers shown in phantom riding at the top of the cam surface;

FIG. 9 is a cross-section al view taken along the line 9—9 in FIG. 4;

FIG. 10 is the same view as FIG. 8, with the rollers shown in phantom riding a t the bottom of the cam surface;

FIG. 11 is a diagram showing the unwrapped cam profile of the cam shown in FIGS. 3, 4, 8 and 10.

DETAILED DESCRIPTION OF PREFERRED EMBODIMENTS

Figure 1:
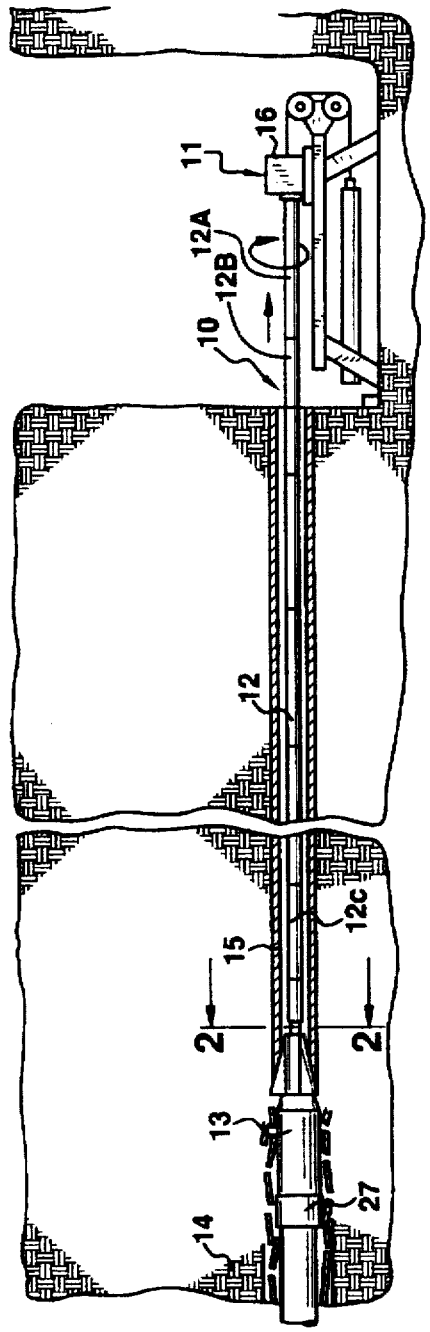
FIG. 1 is a schematic diagram of a directional boring apparatus being used in a pipe pulling and bursting operation according to the invention.
Figure 5:
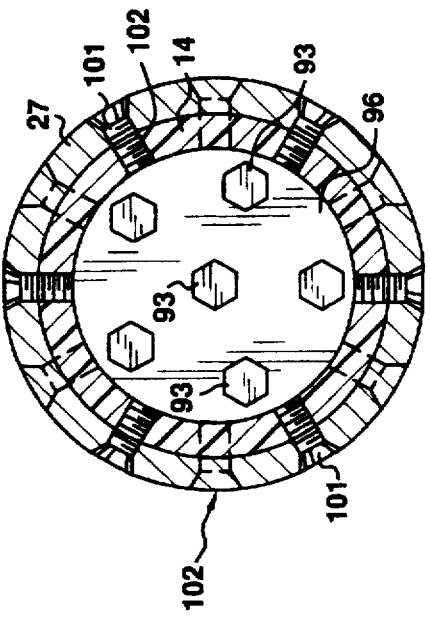
FIG. 5 is a cross-sectional view taken along the line 5—5 in FIG. 3.
Figure 2:
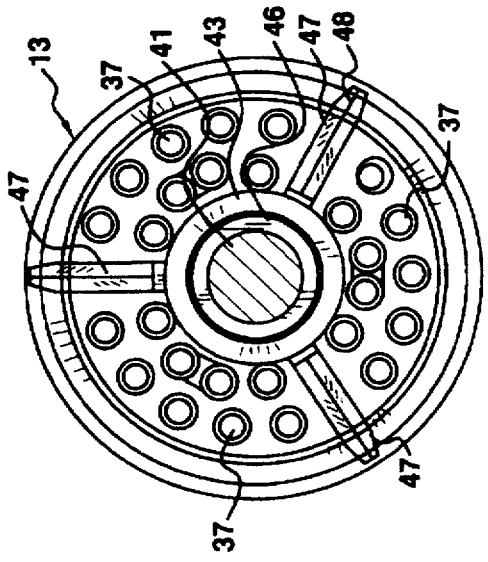
FIG. 2 is a front view of the impact device of the invention shown in FIG. 1.

Referring to FIG. 1, a pipe bursting and replacement system 10 according to the invention includes a directional boring machine 11, a drill string 12, and an impact tool 13 which draws a plastic replacement pipe 14 along behind it. Pipe 14 is typically made of high density polyethylene (HDPE). The front end of impact tool 13 bursts an existing clay, iron or concrete pipe 15 as it advances through th e ground, as explained hereafter.

Directional boring machine 11 may be of a type commercially available for directional boring. Drill string 12 is a series of detachable steel rods, generally 3 to 10 feet in length, connected end to end in a series that may reach 1000 feet in length. Boring machine 11 simultaneously rotates drill string 12 and pulls it forward by means of a carriage 16 mounted on a rail or groove in boring machine 11. When carriage 16 reaches the position shown in FIG. 1, the adjoining section 12A of drill string 12 is removed, and carriage 16 is moved forward and reconnected to the end of the next adjacent section 12B. In this manner the impact tool 13 and replacement pipe 14 are drawn through the bore formed by impact tool 13.

Figure 3:
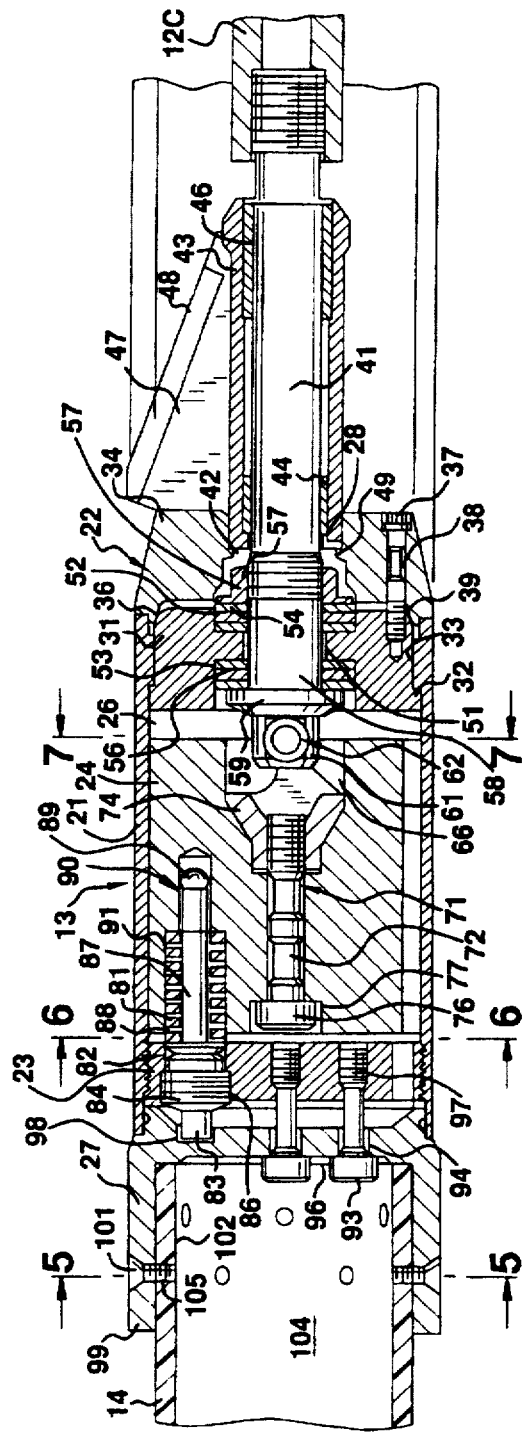
FIG. 3 is a lengthwise sectional view of the impact device of the invention shown in FIG. 1, with the striker in a retracted position.
Figure 4:
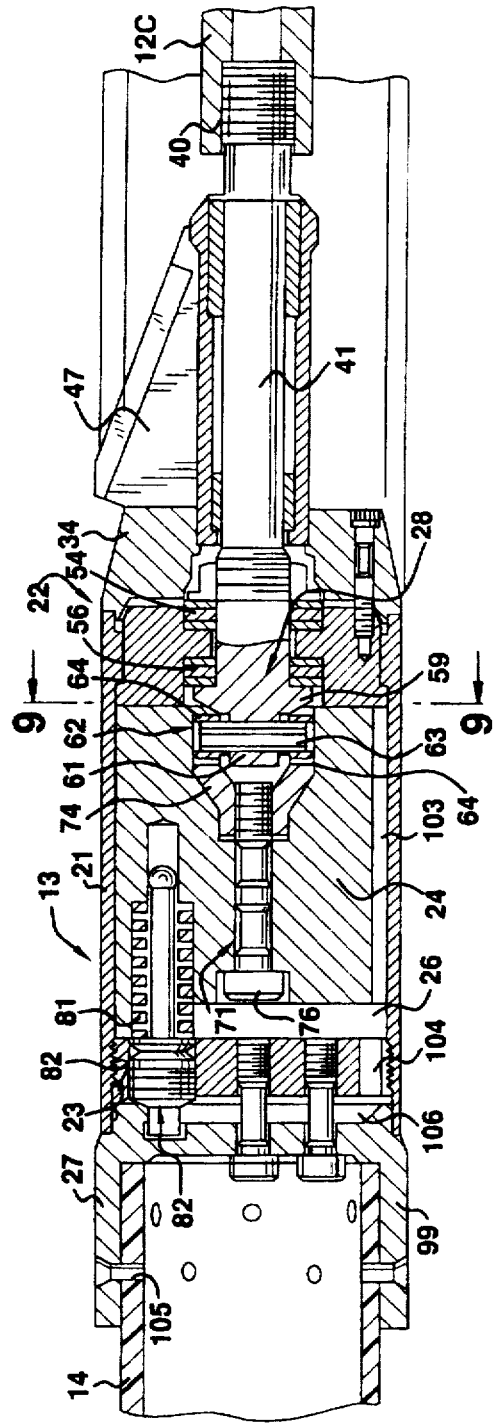
FIG. 4 is a lengthwise sectional view of the impact device of the invention shown in FIG. 1, with the striker in a forward impact position.

An innermost drill string section 12C is secured as by a threaded connection to the end of impact tool 13 as shown in FIGS. 3 and 4. Impact tool 13 includes a tubular housing 21, a front end cap 22, a tail nut 23, a striker 24 that reciprocates in an internal chamber 26 between end cap 22 and tail nut 23, a tailpiece 27 adapted for towing the replacement pipe 14, and a drive mechanism 28 that reciprocates the striker 24 in response to rotation of drill string 12 as described hereafter.

Front end cap 22 includes a front anvil (rear section) 31 having an annular flange 32 that seats against a radially inwardly directed annular flange 33 formed near a front end opening of tubular housing 21. A front section 34 of front end cap 22 is seated ahead of flange 33 by means of a rearwardly extending annular flange 36 that fits closely within the front end opening of housing 21. Bolts 37 extending rearwardly through holes 38 in front section 34 are threadedly secured in corresponding threaded, frontwardly opening blind holes 39 in front anvil 31 in order to clamp load front and rear sections 34, 31 securely. At the other end of the tool, circular tail nut 23 is threadedly secured at its periphery in a rear end portion of housing 21.

Drive mechanism 28 includes an elongated input shaft 41 threaded at its front end for connection to a threaded counterbore 40 in drill string section 12C as shown. Shaft 41 extends coaxially through a central opening 42 in front anvil 31. A front end portion of shaft 41 has a coaxial journal bearing sleeve 43 mounted thereon by means of front and rear journal bearings 44, 46. Bearings 44, 46 provide an anti-friction surface for shaft 41 in the event a side load is applied to shaft 41. Three generally triangular pipe bursting blades 47 are secured as by welding to sleeve 43 in equiangular positions. The outwardly facing sharp edge 48 of each blade 47 tapers forwardly and has a maximum diameter slightly greater than that of housing 21 so that edge 48 will engage an existing pipe 15 having the same, slightly smaller or slightly larger diameter than the tool housing 21. A rear end of sleeve 43 abuts against a radially inwardly directed annular flange 49 in opening 42.

A rear end portion of input shaft 41 is mounted in a central hole 51 in front anvil 31. Central hole 51 includes a pair of frontwardly and rearwardly opening counterbores 52, 53 of like diameter. A pair of front and rear thrust bearings 54, 56 disposed in counterbores 52, 53 support input shaft 41 for rotation within front anvil 31. Thrust bearings 54, 56 prevent excessive friction when a towing load is applied by drill string 12, which load may be 30,000 pounds or more. The front end of front thrust bearing 54 is clamped against a bottom wall of counterbore 52 by a thrust preload nut 57 threadedly secured to the outside of an enlarged diameter midsection 58 of shaft 41. Preload nut 57 prevents movement of thrust bearings 54, 56 during striker impact. The rear end of rear thrust bearing 56 is similarly clamped against a bottom wall of counterbore 53 by a radially outwardly extending annular flange 59 at the rear end of midsection 58 of shaft 41.

A reduced diameter rear end portion 61 of shaft 41 extending from the rear of flange 59 has a transverse follower mechanism 62 mounted thereon. Follower mechanism 62 includes an axle 63 oriented transversely to shaft 41 and a pair of tubular lifting rollers 64 mounted on opposite protruding ends of axle 63 as shown. Rollers 64 are confined between an outer surface of rear end portion 61 and an inner surface of a central, frontwardly opening recess 66 in striker 24 and are free to rotate on axle 63. Axle 63 is non-rotatably fixed within transverse hole 67 in which it is mounted by any suitable means, e.g., a friction-fit or a set screw (not shown) mounted lengthwise in the rear face of end portion 61.

Striker 24 has a cam mechanism 71 mounted in central recess 66 for cooperation with follower mechanism 62. Cam mechanism 71 includes a bolt 72 having a front threaded end 73 that is threaded secured in a rear opening of a cam sleeve 74. Upon tightening bolt 72, a head 76 of bolt 72 is engages the bottom wall of a rearwardly opening counterbore 77 of recess 66, thereby clamping cam sleeve 74 to striker 24.

Cam sleeve 74 has a frontwardly extending annular cam profile 78 that includes a pair of lobes 79. Cam profile 78 has a diameter matching that of a circle described by the rotation of rollers 64 about the lengthwise axis of shaft 41. Lobes 79 are symmetrically spaced so that each roller 64 engages the top of its associated lobe 79 at the same time as the other roller 64. In this manner, when rollers 64 engage lobes 79 at the forwardmost part of cam profile 78 as shown in FIGS. 7 and 8, striker 24 is forced to its rearwardmost position. When rollers 64 are each disposed in between lobes 79 as shown in FIGS. 9 and 10, striker 24 is free to move forward and engage front anvil 31. This occurs as rollers 64 leave lobes 79 and drop along curved steps 80 (FIG. 11).

Striker 24 is biased towards the forward position shown in FIG. 4 by suitable means, such as a series of compression springs 81 mounted on mounting studs 82. Each mounting stud 82 has a hex-shaped head 83, an enlarged diameter threaded midportion 84 secured in a corresponding threaded hole 86 in tail nut 23, a forwardly extending stem 87 that enters a rearwardly opening recess 88 in striker 24, and a ball-shaped tip 89 at the distal end of stem 87. Each recess 88 is radially offset from central recess 66 and includes an inner, narrow end portion 90 into which tip 89 slidingly fits and a counterbore 91 sized to hold spring 81, which is coaxially disposed around stem 87. In this manner, springs 81 are held in proper position and counterbore 91 provides the space needed to accommodate each spring 81 when striker 24 is at or close to its rearmost position as shown in FIG. 3. Mounting studs 82 allow installation of springs 81 after striker 24 and tail nut 23 are installed, and prevent striker 24 from rotating within housing 21.

Tailpiece 27 is secured to tail nut 23 by a series of bolts 93 inserted through holes 94 in an inner wall 96 of tailpiece 27 and into threaded holes 97 in tail nut 23 in positions offset from holes 86. Tail bolts 93 apply a clamp loading force to tail nut 23, holding nut 23 tight. Frontwardly opening recesses 98 can be provided in inner wall 96 if needed to accommodate heads 83. A front end of plastic pipe 14 fits closely inside of a rearwardly opening cylindrical side wall 99 of tailpiece 27. Set screws 101 inserted through radial holes 102 in side wall 99 and into aligned, drilled holes 105 in pipe 14 secure is pipe 14 to tailpiece 27. In the alternative, other suitable means for towing the replacement pipe could be provided on the rear end cap, for example, a mesh that grips the external surface of the pipe by friction, a towing cable secured to the eye of a plug inserted into the end of the pipe, or the like.

The pipe bursting and replacement system 10 of the invention operates as follows. Drill string 12 is simultaneously rotated and pulled by carriage 16 of directional boring machine 11. Rotation of drill string 12 causes input shaft 41 to rotate within its bearings as described above. Follower mechanism 62 likewise rotates, describing a circle about the lengthwise axis of input shaft 41. Rollers 64 engage and roll along cam profile 78. As rollers approach the peaks of lobes 79 as shown in FIGS. 3, 7 and 8, striker 24 is forced rearwardly, compressing springs 81. As rollers move off lobes 79 and drop suddenly to their minimum positions (0° and 180° in FIG. 11), striker 24 moves rapidly forward under the action of springs 81 and impacts against front anvil 31, driving the entire impact tool 13 forward.

At the same time, a continuous pulling force is exerted on tool 13 by flange 59 of shaft 41, which force is transmitted to the tool body by means of thrust bearings 54, 56. The net result is a composite of a continuous pulling force and cyclic impacts comparable in force to those obtained by pneumatic ground piercing tools. This composite force, particularly in combination with a bladed bursting head, can burst an existing pipe while simultaneously installing a plastic replacement pipe more efficiently that a directional borer alone and more simply and with less energy consumption than a directional borer used in combination with a pneumatic impact tool.

Since tool 13 does not rely on compressed air, no exhaust passages need to be provided. However, to avoid creating an air buffer that would weaken the impacts by striker 24, striker 24 has external grooves 103 which permit air within internal chamber 26 to flow around the striker as it moves. Tail nut 23 may similarly have one or more air passages 104 which admit air from chamber 26 to a cavity 106 between tail nut 23 and tailpiece 27.

The pipe bursting and replacement system 10 of the invention has several advantages over systems that combine a pneumatic ground piercing tool with a directional borer. As noted above, the absence of exhaust makes the process cleaner, which is particularly important for water or gas lines for which it is undesirable to release exhaust fumes into the interior of the replacement pipe. Pneumatic tools require one or more hoses that run from the tool to the air compressor, which hoses add weight and greatly add to the manual labor needed to perform a replacement job. The system of the invention also uses a single machine (the directional borer) to accomplish both pulling/pushing and cyclic impact, as compared to conventional systems which must provide a winch or directional borer for pulling/pushing and a completely separate energy source (an air compressor) to power the impact device.

Figure 12:
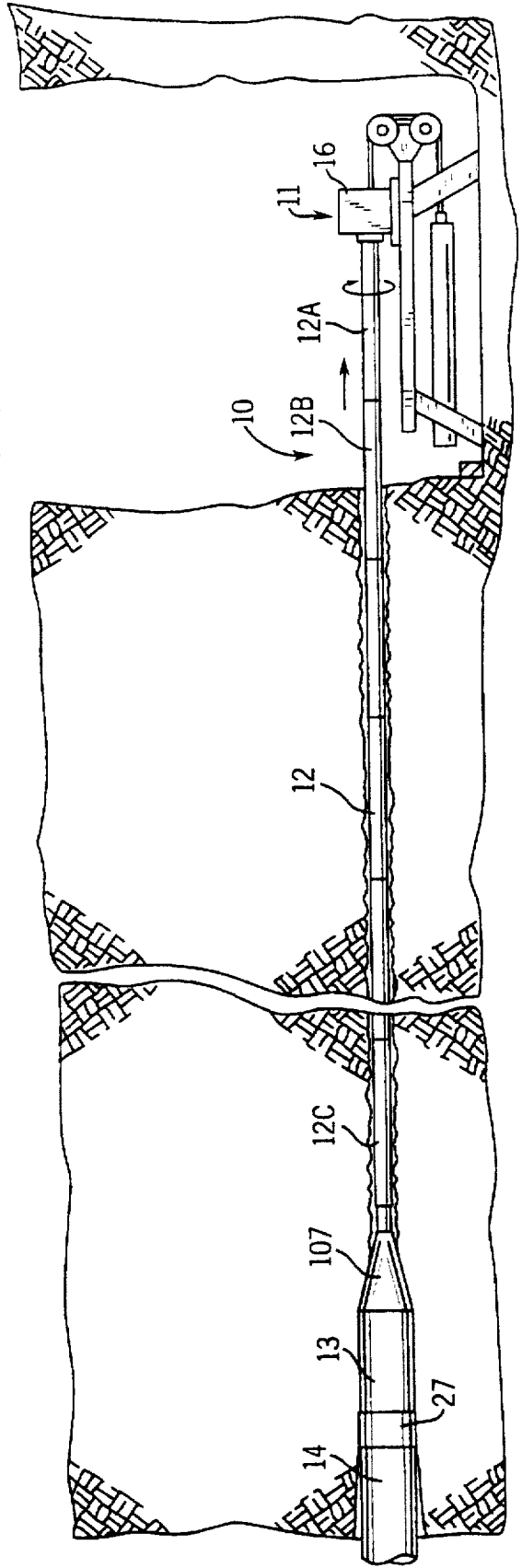
FIG. 12 is a schematic diagram of a directional boring apparatus being used in a hole widening operation according to the invention.

The apparatus of the invention can be used for operations other than pipe bursting, such as widening of an existing borehole. In such a method as summarized above, the bladed head is replaced by a suitable bursting head 107, which may be a forwardly tapered cone as shown in FIG. 12, a stepped or finned head, or other design as known in the art. Tool 13 has a greater outer diameter than the existing borehole. For this purpose, the tool housing 21 itself may have a greater maximum diameter than the existing hole, or a conventional expander may be fitted to boring tool 13 for purposes of widening the hole. As in pipe bursting, the front end of a plastic pipe may be connected to a tailpiece connected to the tool housing so that the new pipe is drawn into place behind the impact tool as the impact tool advances.

It will be understood that the foregoing description is of preferred exemplary embodiments of the invention, and that the invention is not limited to the specific forms shown. For example, the drill string and drive mechanism can be reversed so that the drill string extends behind the tool and exerts a pushing force rather than a pulling force. This embodiment will be most effective for driving new holes because buckling of the drill string will occur if pushing is attempted within a pre-existing hole of larger diameter than the drill string. Similarly, the cam mechanism and follower could be reversed so that the cam is disposed on the input shaft and the follower on the striker. These and other modifications may be made in the design and arrangement of the elements without departing from the scope of the invention as expressed in the appended claims.

I claim:

1. A pipe bursting apparatus, comprising:
  a drill string;
  a directional boring machine that can simultaneously rotate and pull the drill string; and
  an impact tool, including a tubular housing ending in a front bursting head, an input shaft connectable to the drill string, bearings supporting the input shaft for rotation within the housing, a striker disposed for reciprocation within the housing to deliver impacts to a front anvil, and a drive mechanism that simultaneously pulls the impact tool forward in response to a pulling force on the input shaft and reciprocates the striker in response to rotation of the input shaft and drill string to drive the tool forward by the action of cyclic impacts on the front anvil.

2. The pipe bursting apparatus of claim 1, wherein the drive mechanism includes a radially extending flange on the input shaft that engages a thrust bearing mounted within the housing to transmit the pulling force of the input shaft to the tubular housing.

3. The pipe bursting apparatus of claim 1, wherein the drive mechanism includes a cam mechanism and a follower positioned to transmit rotation of the input shaft into lengthwise movement of the striker.

4. The pipe bursting apparatus of claim 3, wherein the drive mechanism further includes a spring biasing the striker for forward movement, and the cam mechanism alternately moves the striker back, compressing the spring, and then releases it for sudden rapid forward movement of the striker ending in an impact against the front anvil.

5. The pipe bursting apparatus of claim 4, wherein the drive mechanism includes a radially extending flange on the input shaft that engages a thrust bearing mounted within the housing to transmit the pulling force of the input shaft to the tubular housing.

6. The pipe bursting apparatus of claim 1, further comprising a rear end cap disposed behind the housing and having means for towing a replacement pipe along behind the impact tool as it advances.

7. The pipe bursting apparatus of claim 6, wherein the towing means comprises a rearwardly opening cylindrical sidewall of the rear end cap and a radial hole through the sidewall for insertion of a fastener therethrough and into the replacement pipe.

8. An impact tool, comprising:

a tubular housing ending in a front bursting head;

an input shaft;

bearings supporting the input shaft for rotation within the housing;

a striker disposed for reciprocation within the tubular housing to deliver impacts to a front anvil; and a drive mechanism that simultaneously pulls the impact tool forward in response to a pulling force on the input shaft and reciprocates the striker in response to rotation of the input shaft to drive the tool forward by the action of cyclic impacts on the front anvil.

9. The pipe bursting apparatus of claim 8, wherein the drive mechanism includes a radially extending flange on the input shaft that engages a thrust bearing mounted within the housing to transmit the pulling force of the input shaft to the tubular housing.

10. The pipe bursting apparatus of claim 8, wherein the drive mechanism includes a cam mechanism and a follower positioned to transmit rotation of the input shaft into lengthwise movement of the striker.

11. The pipe bursting apparatus of claim 10, wherein the drive mechanism further includes a spring biasing the striker for forward movement, and the cam mechanism alternately moves the striker back, compressing the spring, and then releases it for sudden rapid forward movement of the striker ending in an impact against the front anvil.

12. The pipe bursting apparatus of claim 11, wherein the drive mechanism includes a radially extending flange on the input shaft that engages a thrust bearing mounted within the housing to transmit the pulling force of the input shaft to the tubular housing.

13. The pipe bursting apparatus of claim 8, further comprising a rear end cap disposed behind the housing and having means for towing a replacement pipe along behind the impact tool as it advances.

14. The pipe bursting apparatus of claim 13, wherein the towing means comprises a rearwardly opening cylindrical sidewall of the rear end cap and a radial hole through the sidewall for insertion of a fastener therethrough and into the replacement pipe.

15. A method for bursting an underground pipe, using a pipe bursting apparatus comprising a drill string, a directional boring machine that can simultaneously rotate and pull the drill string, and an impact tool including a tubular housing ending in a front bursting head, an input shaft connectable to the drill string, bearings supporting the input shaft for rotation within the housing, a striker disposed for reciprocation within the housing to deliver impacts to a front anvil, and a drive mechanism that simultaneously pulls the impact tool forward in response to a pulling force on the input shaft and reciprocates the striker in response to rotation of the input shaft and drill string to drive the tool forward by the action of cyclic impacts on the front anvil, which method comprises the steps of:

positioning the drill string inside the existing pipe with the directional boring machine at one end of the existing pipe and the impact tool at the other end thereof;

connecting the drill string to the input shaft;

positioning the impact tool coaxial with the existing pipe;

rotating the drill string with the boring machine whereby the striker of the impact tool delivers impacts to the front anvil, which impacts are sufficient to cause the bursting head to burst the existing pipe; and pulling the impact tool through the existing pipeline.

16. The method of claim 15, further comprising connecting a front end of a replacement pipe to an end piece connected to the tool housing so that the replacement pipe is drawn behind the impact tool as the impact tool advances.

17. A method for widening an existing borehole, using an apparatus comprising a drill string, a directional boring machine that can simultaneously rotate and pull the drill string, and an impact tool including a tubular housing ending in a boring head, an input shaft connectable to the drill string, bearings supporting the input shaft for rotation within the housing, a striker disposed for reciprocation within the housing to deliver impacts to a front anvil, and a drive mechanism that simultaneously pulls the impact tool forward in response to a pulling force on the input shaft and reciprocates the striker in response to rotation of the input shaft and drill string to drive the tool forward by the action of cyclic impacts on the front anvil, which method comprises the steps of:

positioning the drill string inside the existing borehole with the directional boring machine at one end of the existing borehole and the impact tool at the other end thereof;

connecting the drill string to the input shaft;

positioning the impact tool coaxial with the existing borehole;

rotating the drill string with the boring machine whereby the striker of the impact tool delivers impacts to the front anvil, which impacts are sufficient to cause the boring head to advance in the existing borehole; and pulling the impact tool through the existing borehole.

18. The method of claim 17, further comprising connecting a front end of a pipe to an tailpiece connected to the tool housing so that the pipe is drawn behind the impact tool as the impact tool advances.

19. The method of claim 17, wherein the bursting head is frontwardly tapering and the boring tool has a greater maximum outer diameter than the existing borehole.

* * * * *